UNITED STATES PATENT OFFICE.

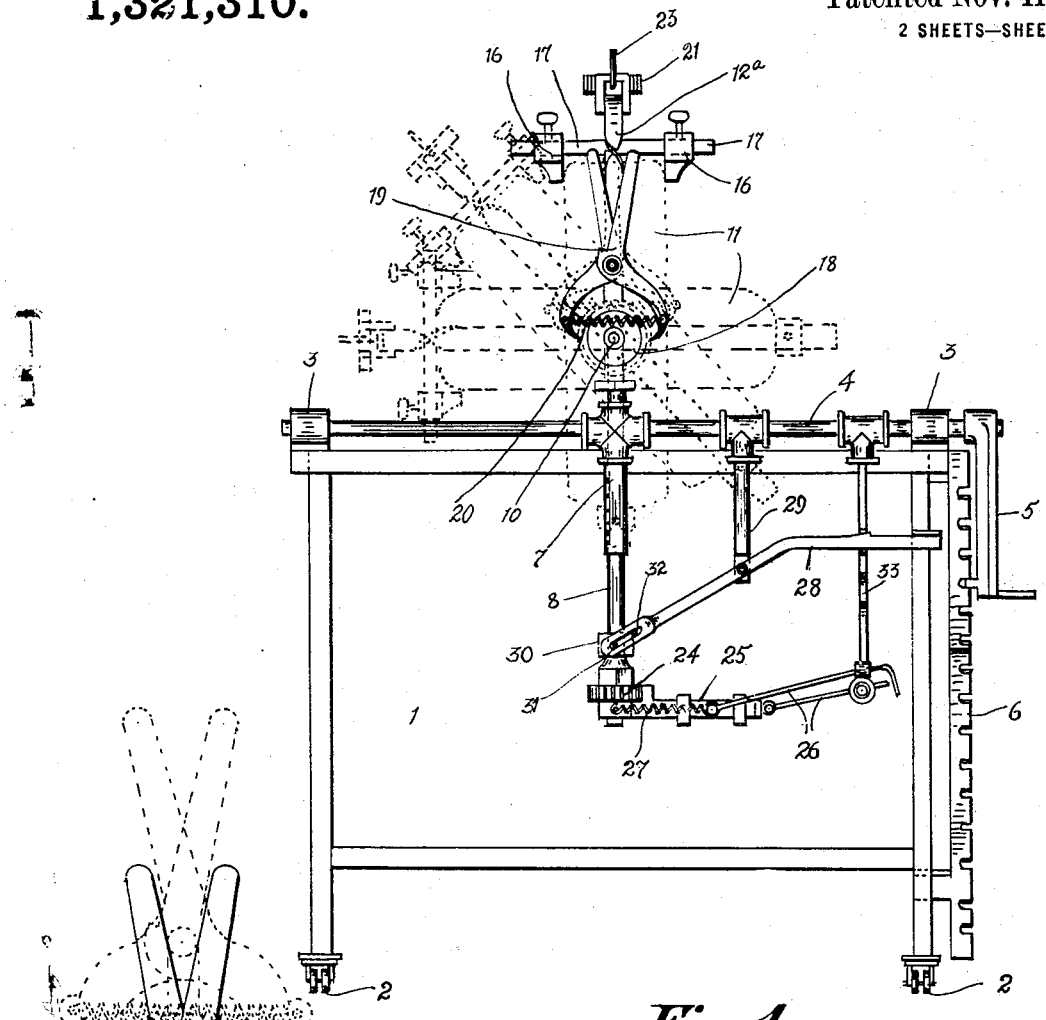
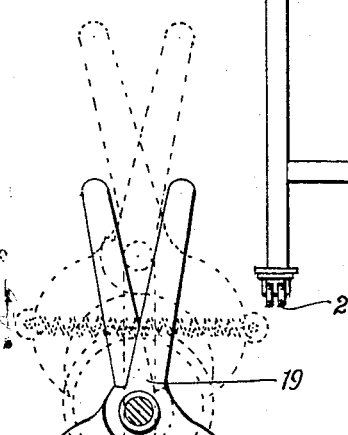
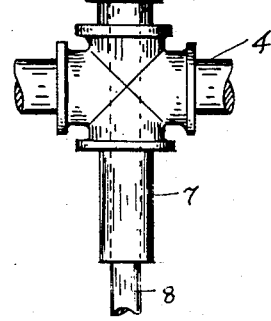
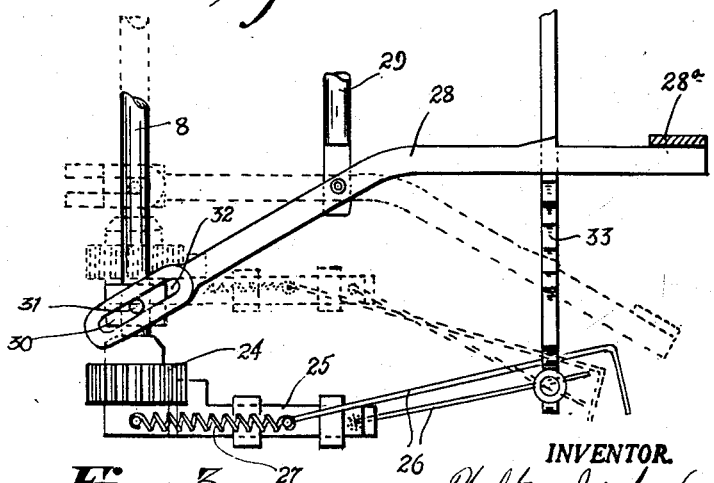

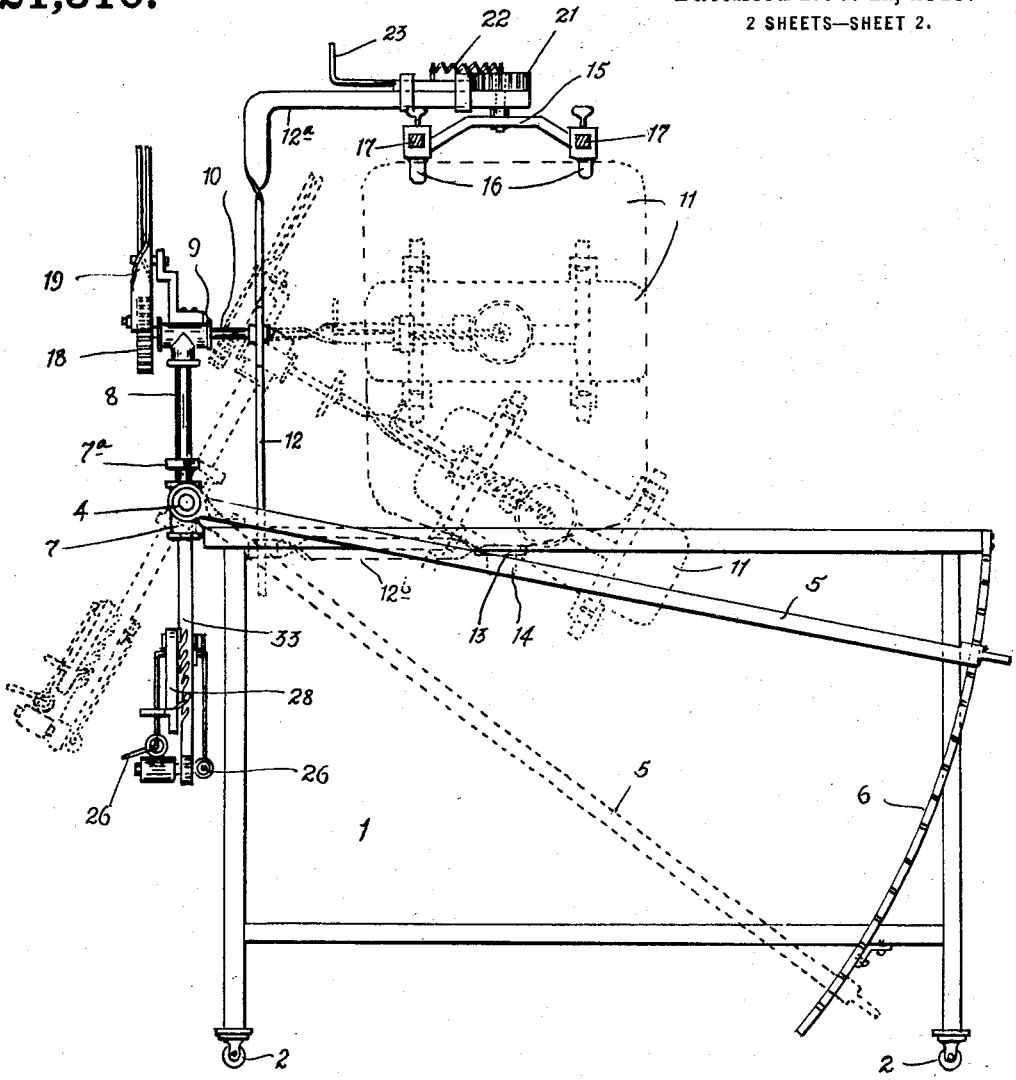

WALTER JERDEN, OF MIDLAND, TEXAS.

APPARATUS FOR REPAIRING AUTOMOBILE-RADIATORS.

1,321,310.             Specification of Letters Patent.        Patented Nov. 11, 1919.

Application filed May 19, 1919. Serial No. 298,278.

*To all whom it may concern:*

Be it known that I, WALTER JERDEN, a citizen of the United States, residing at Midland, in the county of Midland and State of Texas, have invented certain new and useful Improvements in Apparatus for Repairing Automobile-Radiators, of which the following is a specification.

My invention relates to improvements in apparatus for repairing automobile radiators and in such connection it relates more particularly to the arrangement and construction of such an apparatus.

When necessary to remove radiators from the frame of the automobile for repairing leaks, painting, etc., it is a difficult matter to suspend and properly hold the radiator so that all parts of it are easily reached and at the same time to allow of the free use of the operator's hands.

It is the principal object of my invention to provide a stand or holder for use in maintaining radiators at any desired angle when so removed from the automobile body or frame in order that the mechanic may have free access to all parts of the radiator.

Another object of my invention is to provide an apparatus of this kind wherein the leaks in a radiator may be quickly and easily located.

Finally, my object is to provide an apparatus of this character which is very durable, strong and relatively simple in construction and easy of operation.

Briefly my invention consists of a metal vat or tank set upon casters on the rim of which vat and parallel therewith is pivotally attached a rod having a main stem or arm slidably arranged at right angles thereto, the arm carrying a forked member for holding the radiator. The rod has a relatively long lever at one end and a similar lever attached at approximately its center for adjusting the radiator to various angles of inclination.

My invention will be more fully understood from the following description taken in connection with the accompanying drawings forming part hereof, in which—

Figure 1 is an end elevational view of an apparatus embodying my invention, the dotted lines indicating various positions of the radiator.

Fig. 2 is a detail view of the ratchet and wheel for locking the rod carrying the radiator fork.

Fig. 3 is a detail view of a foot lever and means for locking same in various positions, and Fig. 4 is a side elevational view of my invention.

Referring to the drawings, 1 represents a metal tank or vat of any suitable size or dimensions resting upon casters 2—2. On the rim of the tank at the two corners as shown are cuffs 3—3 through which are passed the ends of a rod 4, the rod being rigidly connected to a lever 5, the rod 4 extending across the side of the tank. This lever 5 is slightly longer than the width of the tank and is adapted to be locked in the notches of the curved segment 6 as the radiator 11 is moved into any of the positions shown by the dotted lines at Fig. 4.

At approximately the center of the rod 4 and at right angles thereto is a sleeve 7 with a shoulder $7^a$, and slidably arranged within the sleeve 7 is a rod 8 on the upper end of which is carried a cuff 9, see Fig. 4. The rod 8 is thus adapted to move up and down, and has also a rotary movement in the sleeve. The cuff 9 has also a small rod 10 which rotates in the cuff, allowing the radiator to be turned in any of the positions shown by the dotted lines in Fig. 1.

For attaching the radiator, the usual type of which is shown at 11, to the apparatus, there is connected to the rod 10 a frame consisting of an L-shaped arm 12 bent at right angles on itself as at $12^a$. Another arm $12^b$, adapted to slide on the arm 12 has on its outer end a ring 13 to encircle the cap 14 of the radiator, the object of the slidable arm being to adjust the frame to any size of radiator.

On the bent portion $12^a$ of the L-shaped arm there is provided a bracket consisting of a bridge piece 15 connected to the two parallel arms 17—17 on which the grips 16—16 travel. Means are also provided for locking the bridge piece carrying the grips 16—16 against rotation, which consists of a toothed wheel 21 and spring and pin 22 and 23. Thus the radiator can be turned around to the desired position and locked, as the cap of the radiator moves freely on the opposite end in the ring 14.

The frame consisting of the arms 12 and $12^b$ carried by the rod 10 is also locked against rotation in the cuff 9 by a toothed wheel 18, ratchet 19 and spring 20, (see Fig. 2) the dotted lines indicating the various upward positions when moved by rod 10.

Referring now to Fig. 3, the rod 8 which slides in the sleeve 7 has a foot lever 28 pivoted to one end, the lever being forked and has a slot 32 in each fork and is bent at approximately its center obliquely and pivotally connected to an arm 29 projecting from the main rod 4. A collar 30 on rod 8 carrying a pin 31 is adapted to receive the slots 32 of the forked lever, so that when this lever is pressed by the foot of the operator at 28$^a$ the rod will rise (see dotted lines in Fig. 3) and thus raise the radiator. When in the desired position the foot lever can be locked into engagement with the notched bar or segment 33 in conjunction with the toothed wheel, pin, rods and spring, 24, 25, 26 and 27, respectively, arranged on the end of rod 8 against its rotation.

Having thus described the nature and objects of my invention, what I claim as new and desire to secure by Letters Patent, is:—

1. In an apparatus of the character described, the combination of a tank, a main rod paralleling the rim of said tank, a second rod slidably arranged in a sleeve carried by the main rod and at right angles thereto, an adjustable frame for holding a radiator carried by the second rod, and means for moving the radiator frame and rods to various positions.

2. An apparatus for repairing automobile radiators, consisting, in combination, of a tank, a main rod paralleling the rim of said tank, a second rod slidably arranged on the main rod, an adjustable frame carried by said second rod, and a relatively long arm rigidly connected to one end of the main rod to rotate said rod on its axis.

3. In an apparatus of the character described, the combination of a tank, a relatively long main rod pivoted to the rim of said tank, a second rod adapted to slide at right angles therewith and carrying an adjustable radiator frame, a relatively long lever on the end of the main rod, a foot lever pivoted to an arm extending from the main rod, said lever forked, a slot in each fork to engage a pin on the end of said second rod, and means for locking both rods and levers in position.

In testimony whereof I have signed my name to this specification.

WALTER JERDEN.